United States Patent
Tomita

Patent Number: 6,002,528
Date of Patent: *Dec. 14, 1999

[54] ZOOM LENS

[75] Inventor: Yasuyuki Tomita, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/049,139

[22] Filed: Mar. 27, 1998

[30] Foreign Application Priority Data

Apr. 1, 1997 [JP] Japan ................... 9-098325

[51] Int. Cl.$^6$ ................... G02B 15/14
[52] U.S. Cl. ................... 359/684; 359/687; 359/688
[58] Field of Search ................... 359/684, 687, 359/688, 683, 676

[56] References Cited

U.S. PATENT DOCUMENTS

| | | | |
|---|---|---|---|
| 3,594,066 | 7/1971 | Cook | 359/684 |
| 4,110,006 | 8/1978 | Ikemori | 359/684 |
| 5,416,639 | 5/1995 | Yamanashi | 359/683 |
| 5,737,127 | 4/1998 | Tsutsumi | 359/684 |
| 5,737,128 | 4/1998 | Usui | 359/684 |
| 5,790,316 | 8/1998 | Terasawa et al. | 359/687 |
| 5,808,809 | 9/1998 | Yahagi | 359/684 |

FOREIGN PATENT DOCUMENTS 52-41068 10/1977 Japan .
7-43611 2/1995 Japan .
7-151966 6/1995 Japan .
8-201696 8/1996 Japan .

*Primary Examiner*—Georgia Epps
*Assistant Examiner*—Jordan M. Schwartz
*Attorney, Agent, or Firm*—Fitzpatrick, Cella, Harper & Scinto

[57] ABSTRACT

A zoom lens including, in succession from the object side, a first positive lens unit (focal length f1), a second negative lens unit, a third lens unit, and a fourth positive lens unit, the second and third lens units moving for zooming, the first lens unit having, from the object side, a front lens subunit (focal length f11) fixed during focusing and a rear lens subunit (focal length f12) movable toward the object side for focusing on an infinity object to a short distance object, the front lens subunit having a cemented lens comprising a first negative lens (refractive power N111, Abbe number v111) and a second positive lens (refractive power N112, Abbe number v112) cemented together, the rear lens subunit having first and second positive lenses, wherein, where Ri is the radius of curvature of the ith lens surface from the object side:

$f/11/f1 < -10$ $0.85 < f12/f1 < 1.1$ $-1.77 < (R2+R1)/(R2-R1) < -1.15$ $0.45 < (R3+R2)/(R3-R2) < 0.9$ $-0.7 < (R3+R1)/(R3-R1) < 0.2$ $0.25 < N111 - N112$ $40 < |v111 - v112|$.

5 Claims, 20 Drawing Sheets

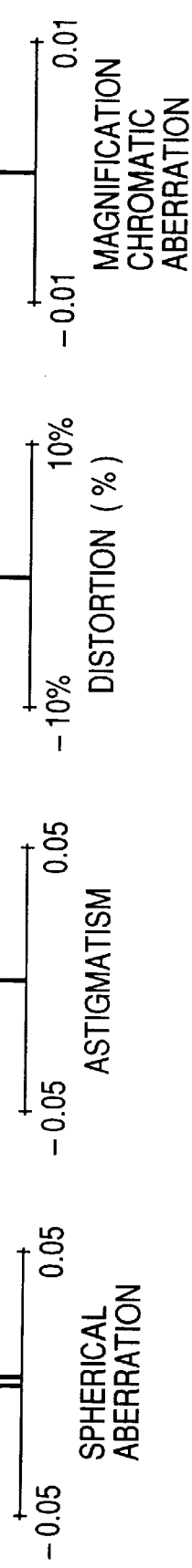

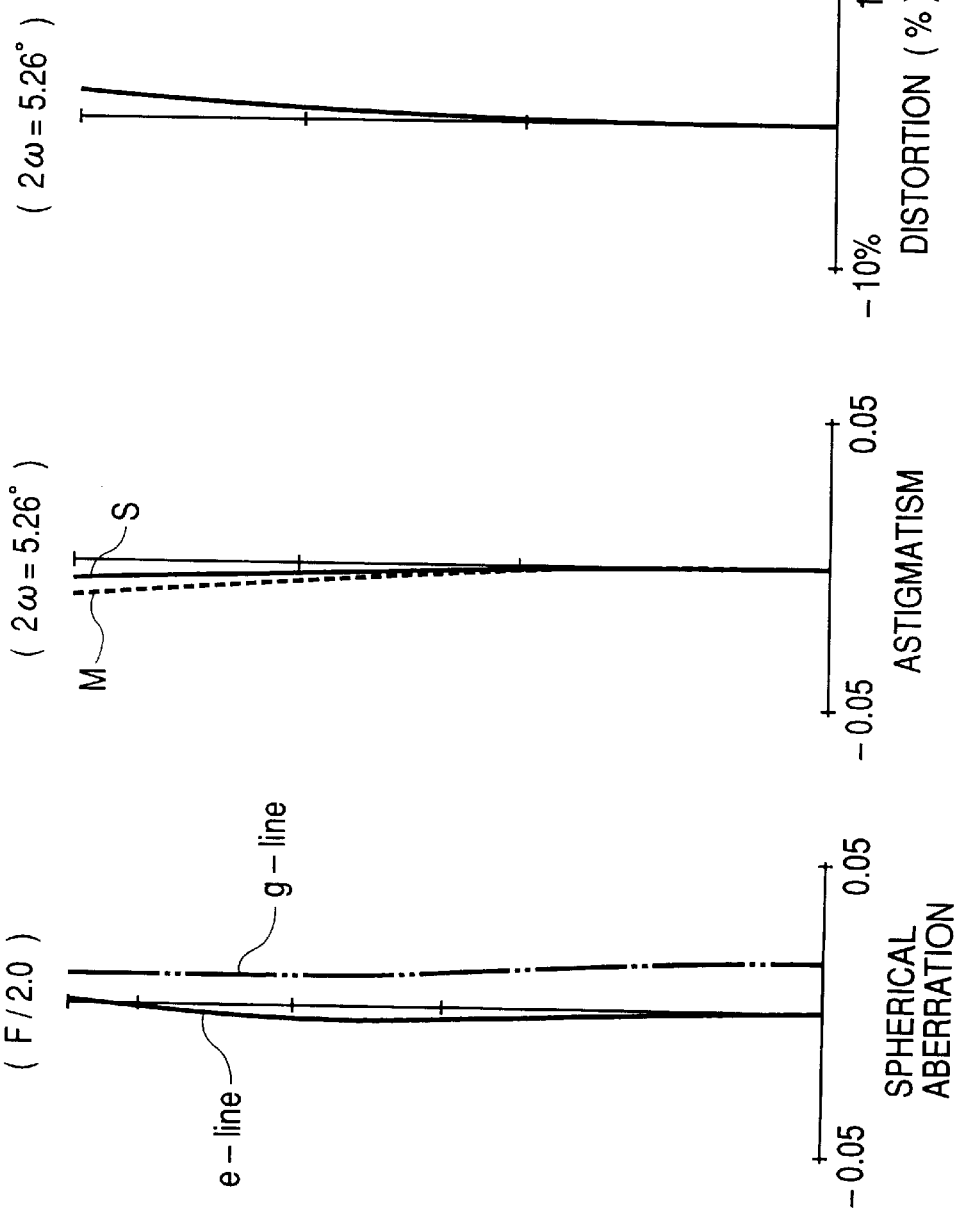

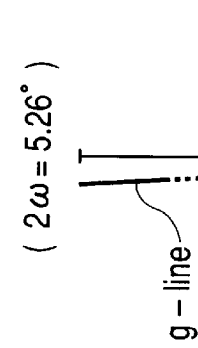
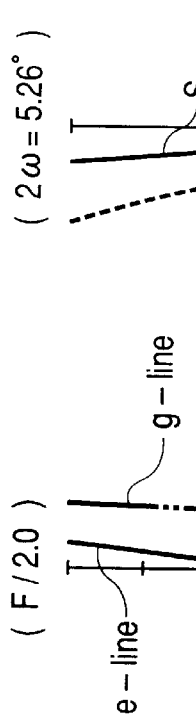
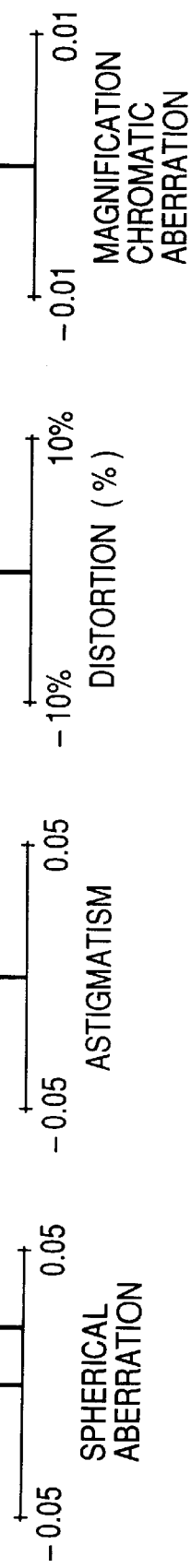

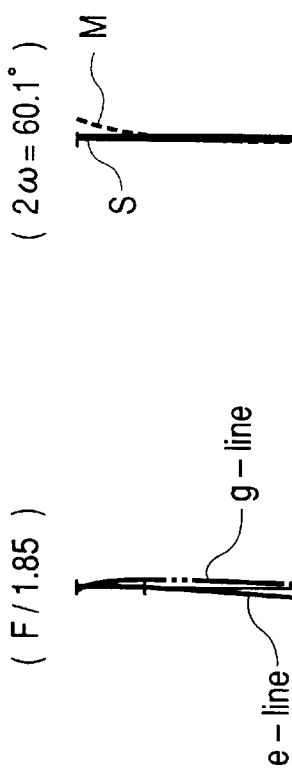

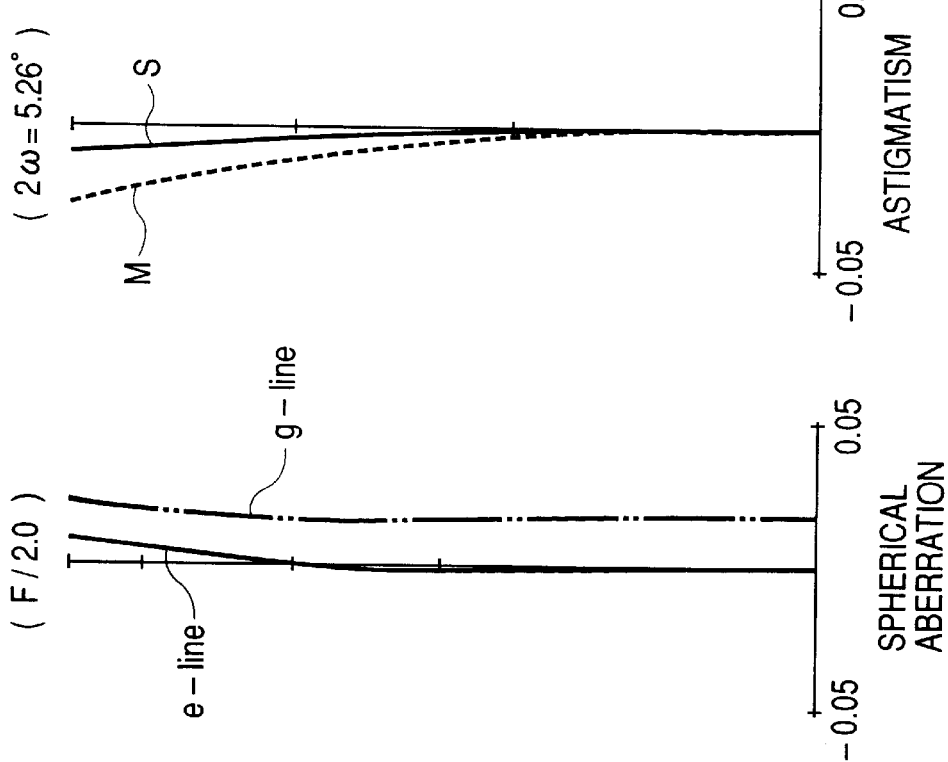
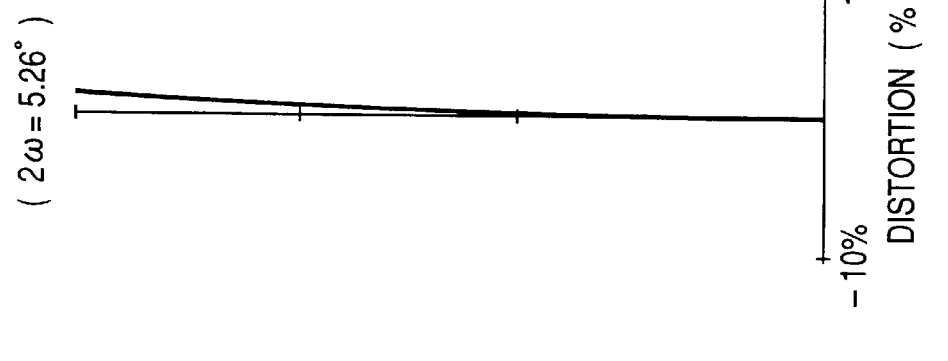
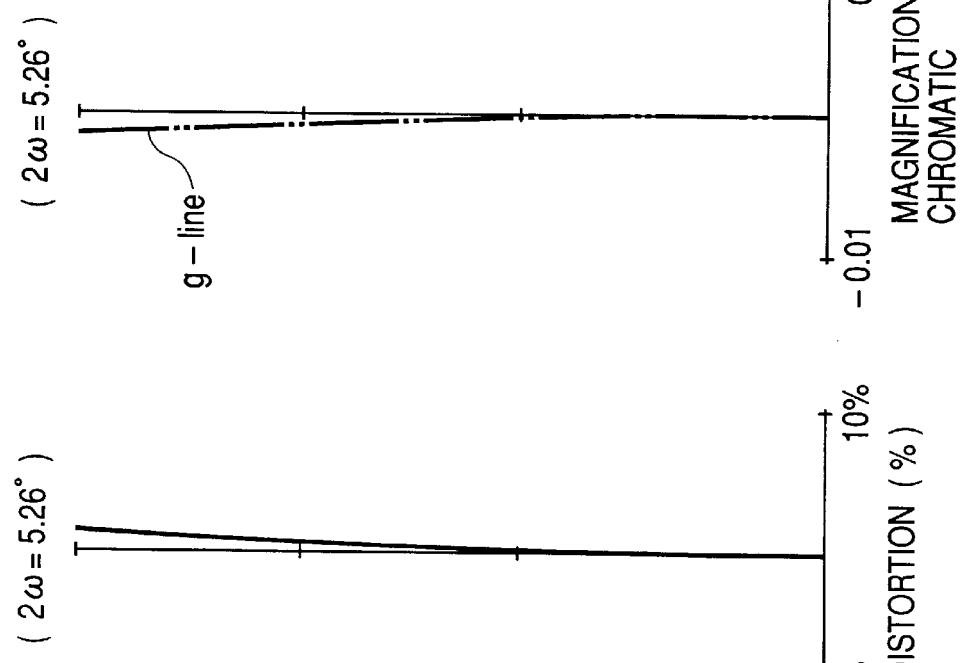
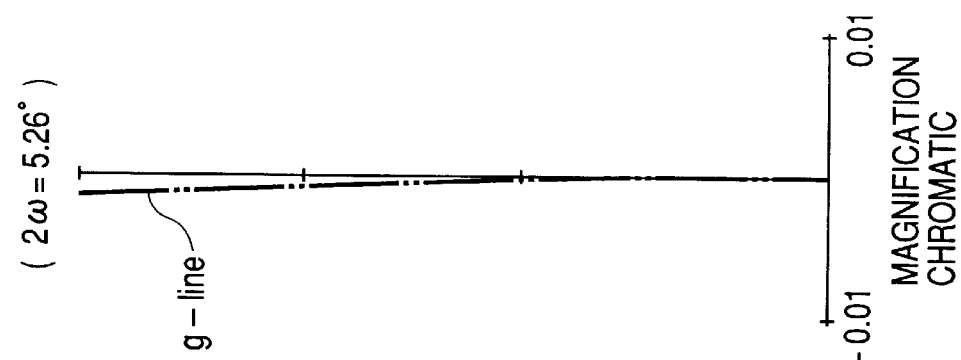

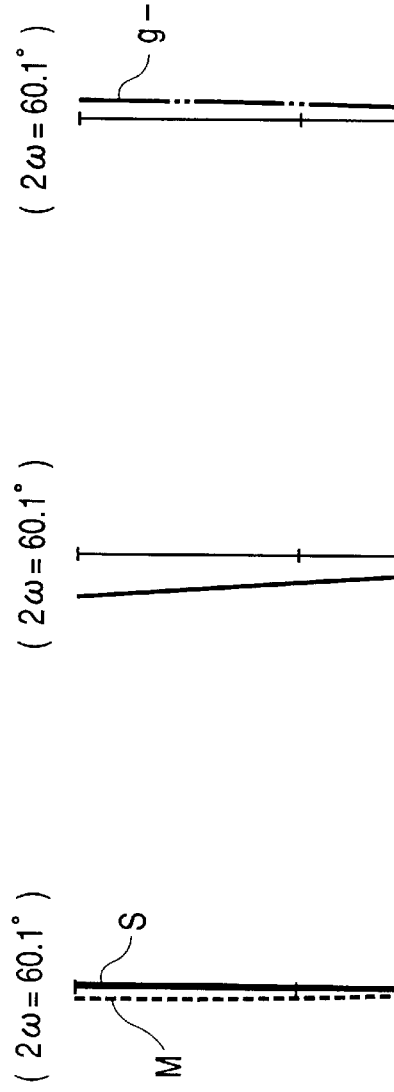
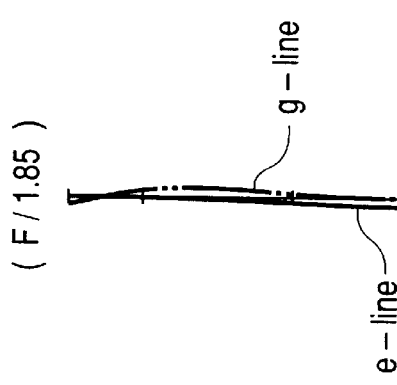
FIG. 13A  FIG. 13B  FIG. 13C  FIG. 13D (F/1.85)
SPHERICAL ABERRATION (2ω=16.1°)
ASTIGMATISM (2ω=16.1°)
DISTORTION (%)

(2ω=16.1°)
MAGNIFICATION CHROMATIC ABERRATION

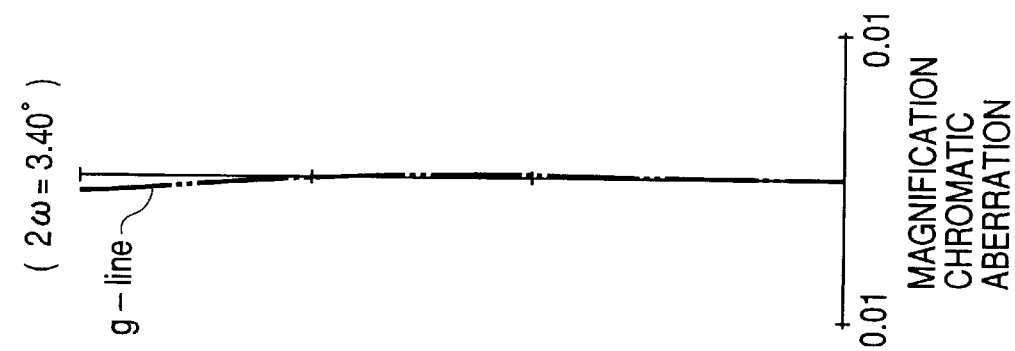
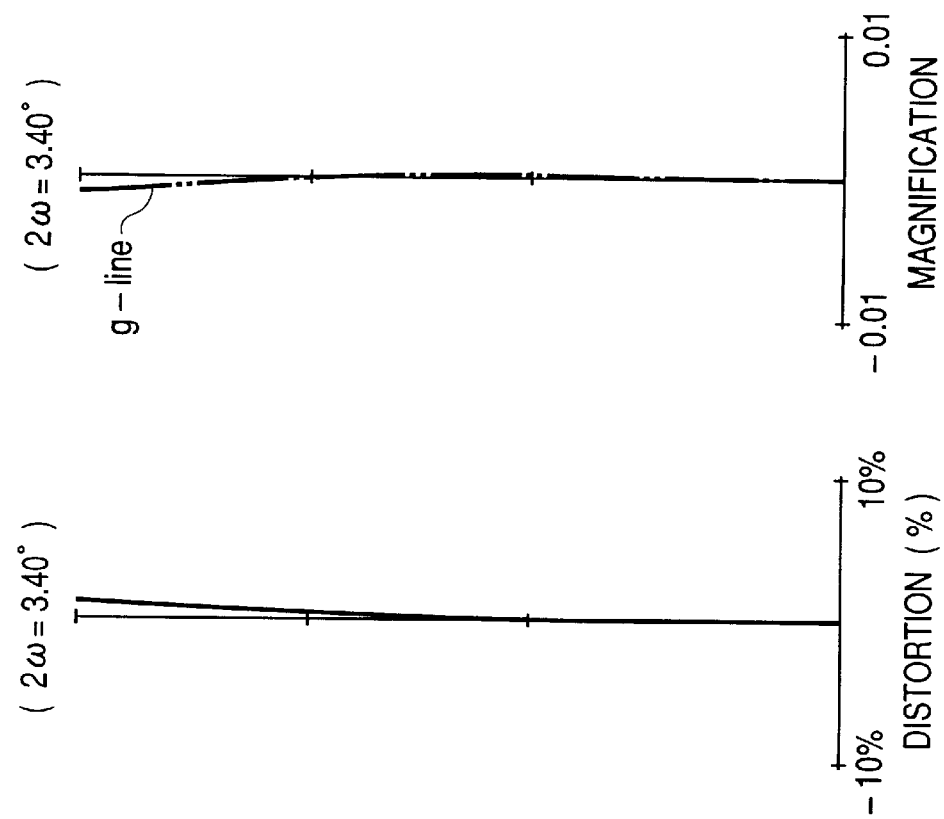
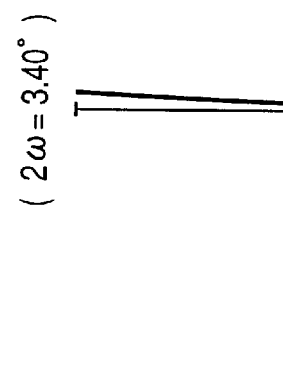
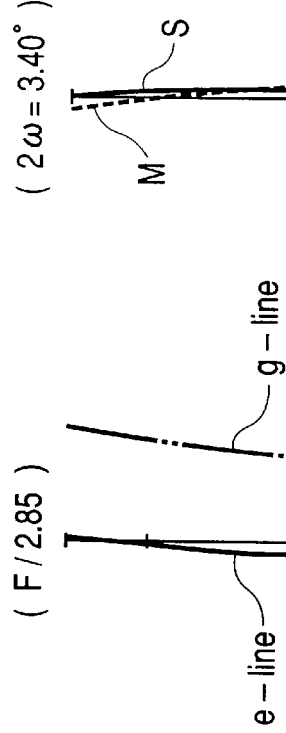

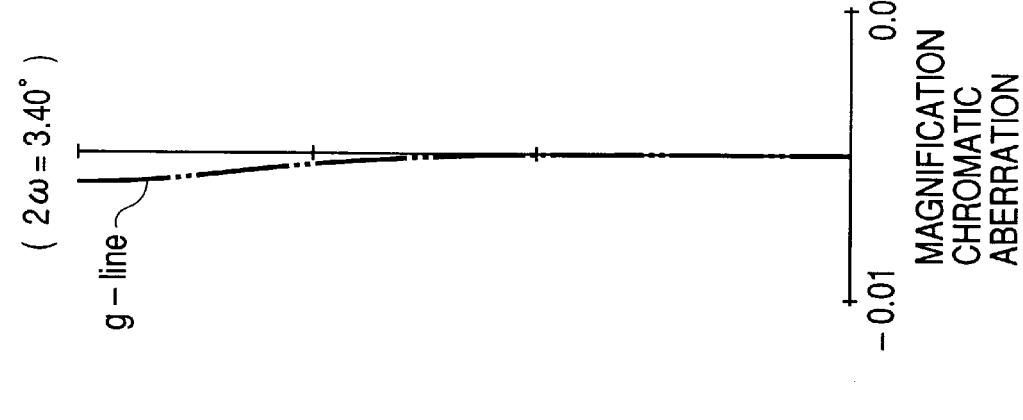
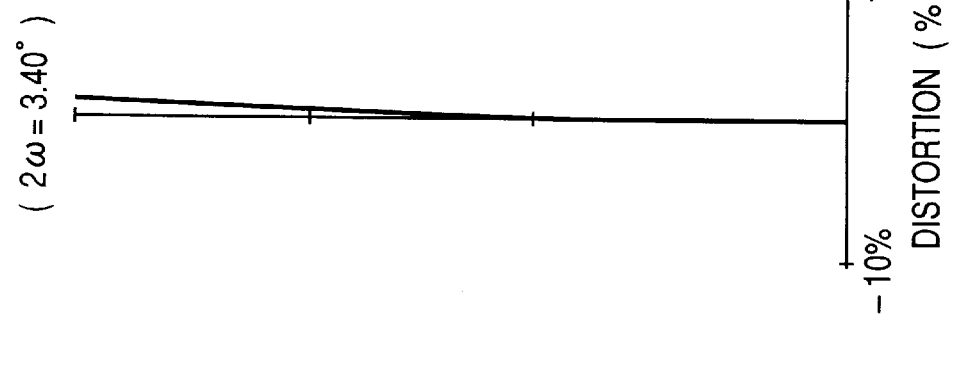
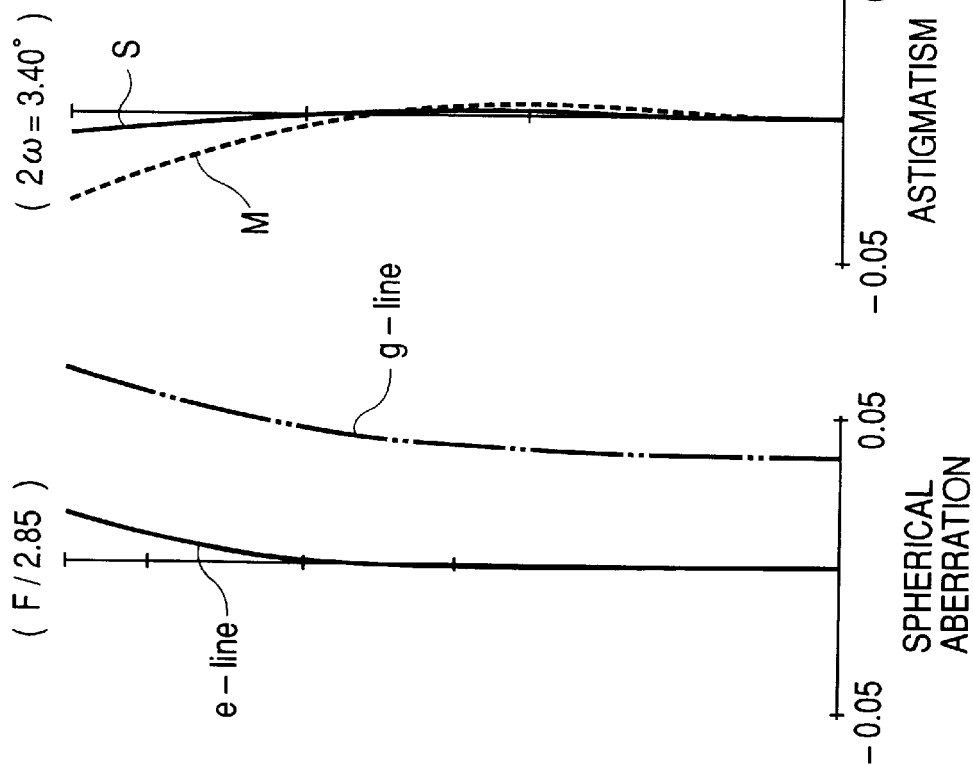
FIG. 16A  FIG. 16B  FIG. 16C  FIG. 16D

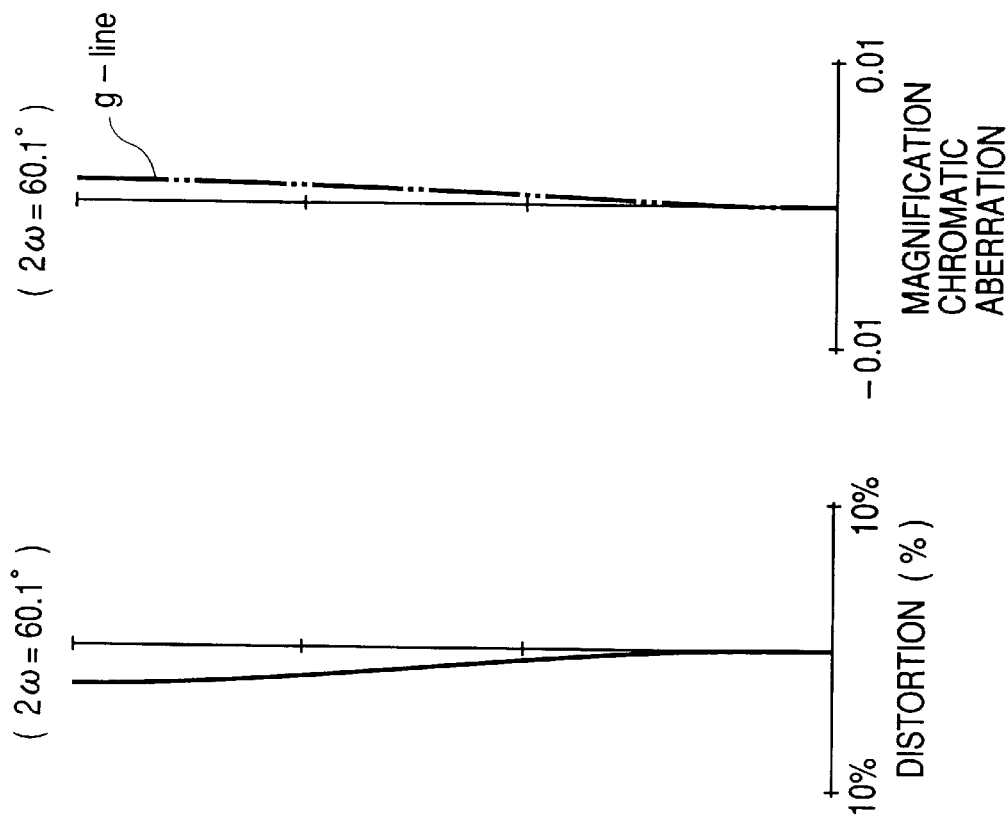
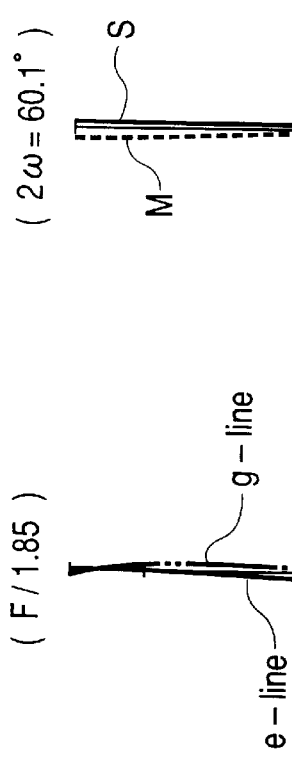
FIG. 17A  FIG. 17B  FIG. 17C  FIG. 17D

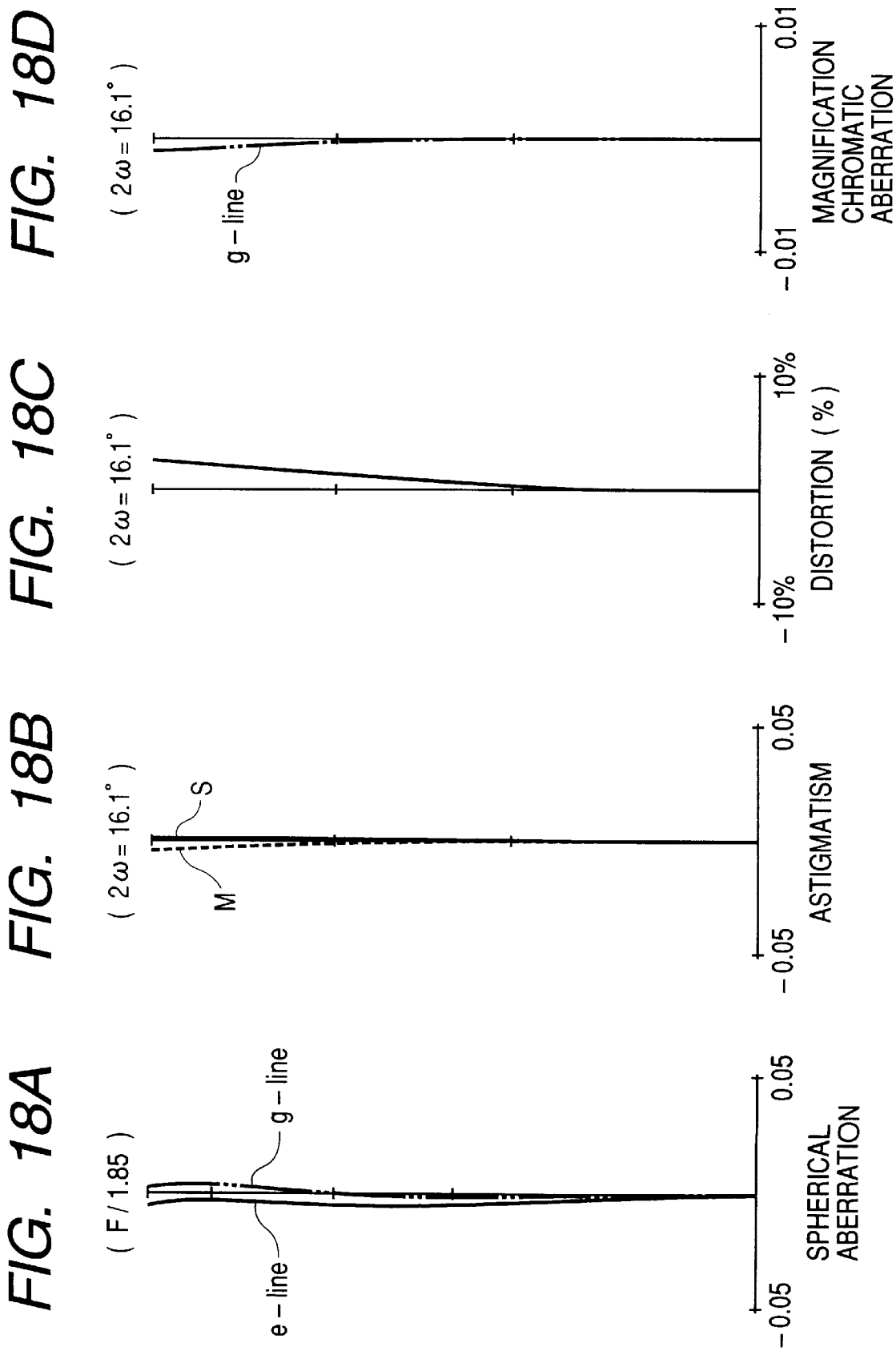

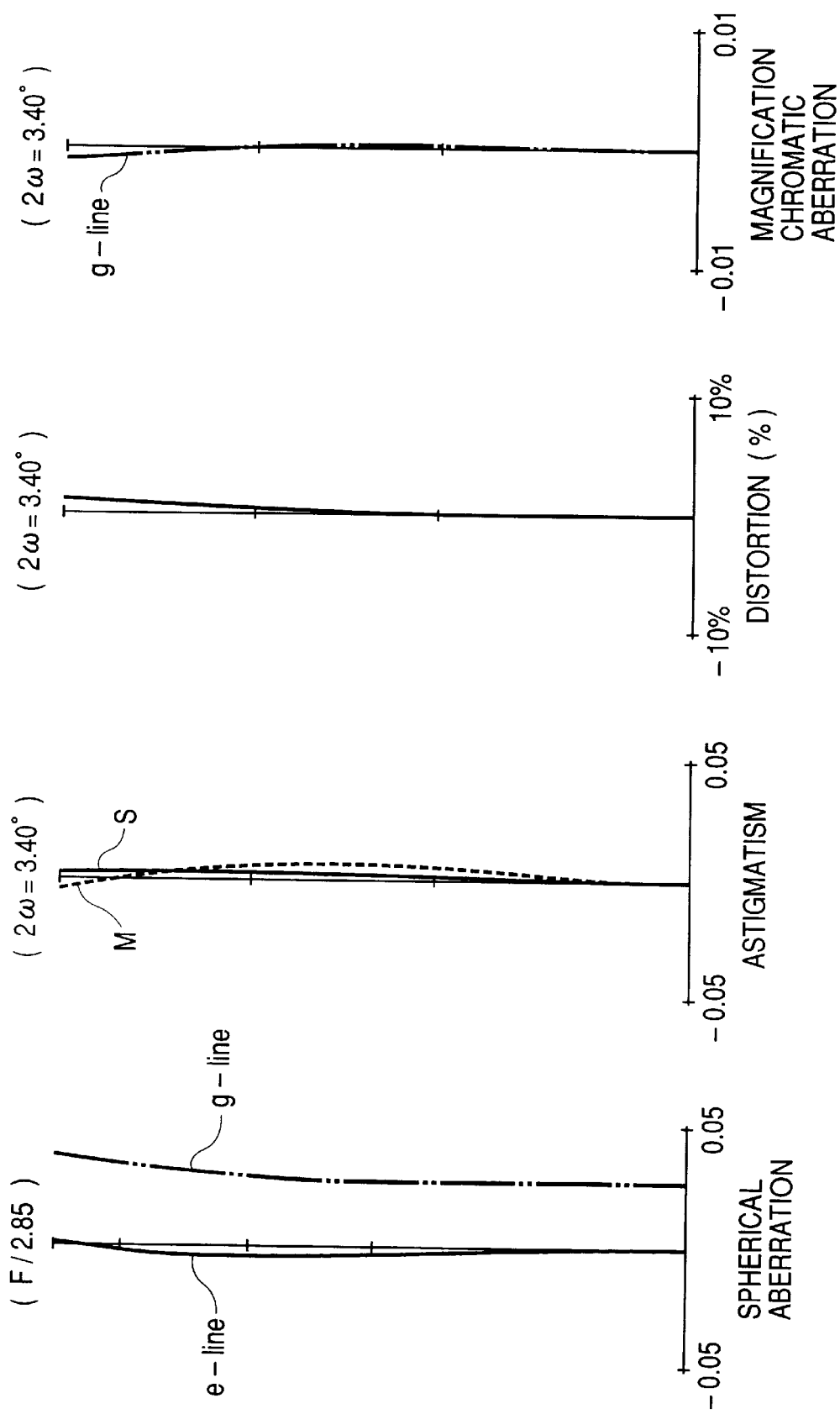

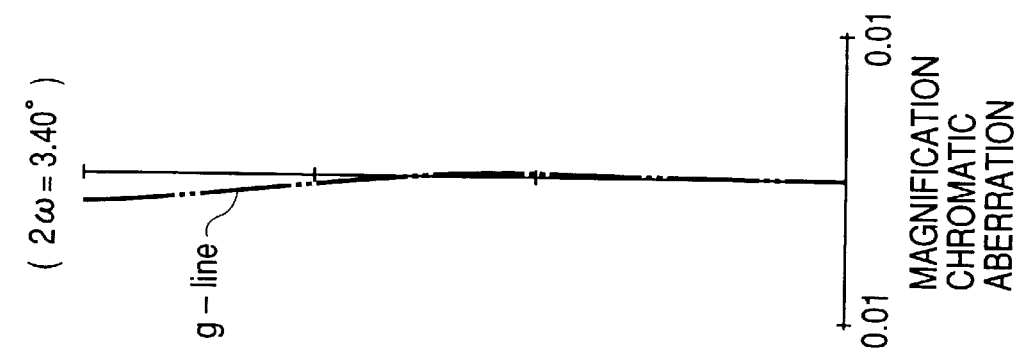

ZOOM LENS

BACKGROUND OF THE INVENTION

1. Field of the Invention

This invention relates to a zoom lens suitable for use in an image pickup apparatus (camera) such as a television camera, a video camera, a photographic camera or a digital camera, and particularly to a zoom lens of a great aperture ratio and a high magnification ratio using the so-called internal focus system (inner focus system) for effecting focusing by some lens units in a first lens unit being moved, thereby having high optical performance over the whole objective distance.

2. Related Background Art

In recent years, in image pickup apparatuses such as television cameras or video cameras, the downsizing and lighter weight of the entire apparatus have been contrived by using a compact solid state image pickup element in order to enhance the operability and mobility of the apparatus. Correspondingly thereto, similar downsizing, lighter weight, and higher specification have also been contrived in zoom lenses used in these image pickup apparatuses.

Among the zoom lenses, a four-unit zoom lens comprising, in succession from the object side, four lens units, i.e., a first lens unit for focusing having a positive refractive power, a second lens unit for focal length change having a negative refractive power, a third lens unit having a positive or negative refractive power for correcting an image plane fluctuating with focal length change, and a fourth lens unit for imaging having positive refractive power is rotatively easily permitted to have a higher magnification and a greater aperture and therefore is often used as the zoom lens of a color television camera for broadcasting.

In the zoom lenses in the latest television cameras and video cameras, the shorter focus of the wide angle end, the longer focus of the telephoto end and a higher variable power ratio have been strongly required. Also, it has become one of the important factors in specification and photographing effect to shorten the shortest photographing distance (MOD).

In zoom lenses, a lens construction in which the power (refractive power) of each lens unit has been strengthened has heretofore been often used in order to achieve downsizing, lighter weight and higher specification. If in this case, an attempt is made to strengthen the power of a first lens unit of positive refractive power for focusing to thereby achieve downsizing and lighter weight, the fluctuations of the various aberrations resulting from a change in the object distance will pose a problem. Particularly, the fluctuations of spherical aberration, astigmatism and chromatic aberration will become great and the optical performance will be remarkably reduced. These fluctuations of the aberrations by focusing become more remarkable as the focal length is longer, that is, in a lens system wherein F number is smaller and which is brighter. Therefore, various propositions have been made in the focusing systems.

Among the focusing systems, various apparatuses adopting the internal focusing system in which some other lens units in the lens system than a first lens unit on the object side are moved to thereby effect focusing have heretofore been proposed.

Generally in a zoom lens of the internal focusing type, as compared with a zoom lens in which a first lens unit is moved to effect focusing, the effective diameter of a first lens unit can be made small and the shortening of the shortest photographing distance is easy and further, focusing is effected with a relatively small lens unit moved, and this leads to the features that the drive force for lens units may be small and that quick focusing can be done.

As such a zoom lens of the internal focusing type, for example, Japanese Patent Publication No. 52-41068 proposes a four-unit zoom lens comprising, in succession from the object side, four lens units, i.e., a first lens unit of positive refractive power, a second lens unit of negative refractive power for focal length change, a third lens unit of a negative refractive power for correcting the movement of an image point resulting from focal length change, and a fourth lens unit of a positive refractive power, wherein some lens units in the first lens unit which are adjacent to the image plane are moved to effect focusing.

To obtain a great aperture ratio and a high variable power ratio and moreover high optical performance over the entire variable power range and the entire focus range in a zoom lens, it is necessary to appropriately set the refractive power of each lens unit, the construction of the lens, the aberration apportionment, the achromatism apportionment, etc.

For example, to obtain high optical performance in which the fluctuations of aberrations are small over the entire variable power range and the entire focus range, it becomes necessary in many cases to increase the number of the constituent lenses in each lens unit and increase the degree of freedom in aberration correction. Therefore, if an attempt is made to achieve a zoom lens of a great aperture ratio and a high variable power ratio, there will unavoidably arise the problem that the number of lenses increases and the entire lens system becomes bulky.

Also, if MOD is shortened, there will arise the problem that the fluctuations of aberrations, particularly the fluctuation of spherical aberration at the telephoto end, during focusing, becomes great and it becomes very difficult to contrive the downsizing of the entire lens system over the whole object distance from an infinity object to a short distance object, and yet obtain high optical performance.

So, as one of means for solving these problems, there have been proposed some examples adopting the aforedescribed internal focusing system.

However, the focusing system proposed, for example, in the aforementioned Japanese Patent Publication No. 52-41068 has not always been of a sufficient lens construction for a zoom lens for broadcasting of which a great aperture ratio, a high variable power ratio, shorter MOD and a high specification are required. Particularly, it has not always been sufficient as a zoom lens for broadcasting in which the apportionment of refractive power to a lens unit fixed during the focusing of a first lens unit and a lens unit axially moved for focusing and the refractive power, the dispersion value, etc. of the material of each lens are of a high specification.

Generally, to achieve the downsizing and lighter weight of an entire zoom lens which are the recent user's demands and yet contrive a higher specification, it is necessary to appropriately set the refractive power and lens construction of each lens unit. Particularly in a four-unit zoom lens, it is an important factor how well balancedly the lens construction of a first lens unit (front lens) which most governs the size and weight of the entire lens system should be designed relative to the lens construction of the entire zoom lens system.

SUMMARY OF THE INVENTION

The present invention has as its object the provision of a four-unit zoom lens of a great aperture ratio and a high variable power ratio having F number of the order of 1.8 at the wide angle end and a variable power ratio of the order of 13 to 20 times in which a first lens unit (front lens) is divided into two lens units, i.e., a lens unit movable and a lens unit fixed, during focusing, and the refractive power or the like of each lens unit is appropriately set and such disposition, a aberration apportionment and achromatism apportionment of lens elements that can suppress the fluctuations of aberrations by focusing to the utmost are prescribed so as to satisfy predetermined conditions to thereby reduce the fluctuations of spherical aberration and chromatic aberration resulting from focal length change and focusing and further, well-balancedly correct the fluctuations of off-axis aberrations such as astigmatism and curvature of image field resulting from focal length change, and which has high optical performance over the entire variable power range and the entire focus range.

The zoom lens of the present invention comprises, in succession from the object side, a first lens unit of positive refractive power, a second lens unit of negative refractive power, a third lens unit and a fourth lens unit of positive refractive power, the second and third lens units being moved to effect zooming, the first lens unit having a front lens subunit fixed during focusing and a rear lens submit movable toward the object side for focusing on an infinity object to a short distance object, the front lens subunit having a cemented lens comprising a first negative lens and a second positive lens cemented together, the rear lens subunit having a first positive lens and a second positive lens, characterized in that the zoom lens satisfies the following conditions:

$$f/11/f1 < -10 \quad (1)$$

$$0.85 < f12/f1 < 1.1 \quad (2)$$

$$-1.77 < (R2+R1)/(R2-R1) < -1.15 \quad (3)$$

$$0.45 < (R3+R2)/(R3-R2) < 0.9 \quad (4)$$

$$-0.7 < (R3+R1)/(R3-R1) < 0.2 \quad (5)$$

and further $$0.25 < N111 - N112 \quad (6)$$

$$40 < |v111 - v112|. \quad (7)$$

where f1, f11 and f12 are the focal lengths of the first lens unit, the front lens subunit and the rear lens subunit, respectively, Ri is the radius of curvature of the ith lens surface as counted from the object side of the first lens unit, N111 and v111 are the refractive power and the Abbe number, respectively, of the material of the first negative lens of the front lens subunit, and N112 and v112 are the refractive power and the Abbe number, respectively, of the material of the second positive lens of the front lens subunit.

BRIEF DESCRIPTION OF THE DRAWINGS

FIGS. 5A, 5B, 5C and 5D show the aberrations of Numerical Value Embodiment 1 of the present invention at the wide angle end thereof.

FIGS. 7A, 7B, 7C and 7D show the aberrations of Numerical Value Embodiment 1 of the present invention at the telephoto end thereof (the object distance is 300 mm).

FIGS. 8A, 8B, 8C and 8D show the aberrations of Numerical Value Embodiment 1 of the present invention at the telephoto end thereof (the object distance is infinity).

FIGS. 9A, 9B, 9C and 9D show the aberrations of Numerical Value embodiment 2 of the present invention at the wide angle thereof.

FIGS. 10A, 10B, 10C and 10D show the aberrations of Numerical Value Embodiment 2 of the present invention at the medium focal length thereof.

FIGS. 12A, 12B, 12C and 12D show the aberrations of Numerical Value Embodiment 2 of the present invention at the telephoto end thereof (the object distance is infinity).

FIGS. 13A, 13B, 13C and 13D show the aberrations of Numerical Value Embodiment 3 of the present invention at the wide angle end thereof.

FIGS. 15A, 15B, 15C and 15D show the aberrations of Numerical Value Embodiment 3 of the present invention at the telephoto end thereof (the object distance is 300 mm).

FIGS. 16A, 16B, 16C and 16D show the aberrations of Numerical Value Embodiment 3 of the present invention at the telephoto end thereof (the object distance is infinity).

FIGS. 17A, 17B, 17C and 17D show the aberrations of Numerical Value Embodiment 4 of the present invention at the wide angle end thereof.

FIGS. 18A, 18B, 18C and 18D show the aberrations of Numerical Value Embodiment 4 of the present invention at the medium focal length thereof.

FIGS. 19A, 19B, 19C and 19D show the aberrations of Numerical Value Embodiment 4 of the present invention at the telephoto end thereof (the object distance is 300 mm).

FIGS. 20A, 20B, 20C and 20D show the aberrations of Numerical Value Embodiment 4 of the present invention at the telephoto end thereof (the object distance is infinity).

DESCRIPTION OF THE PREFERRED EMBODIMENTS

Figure 1:
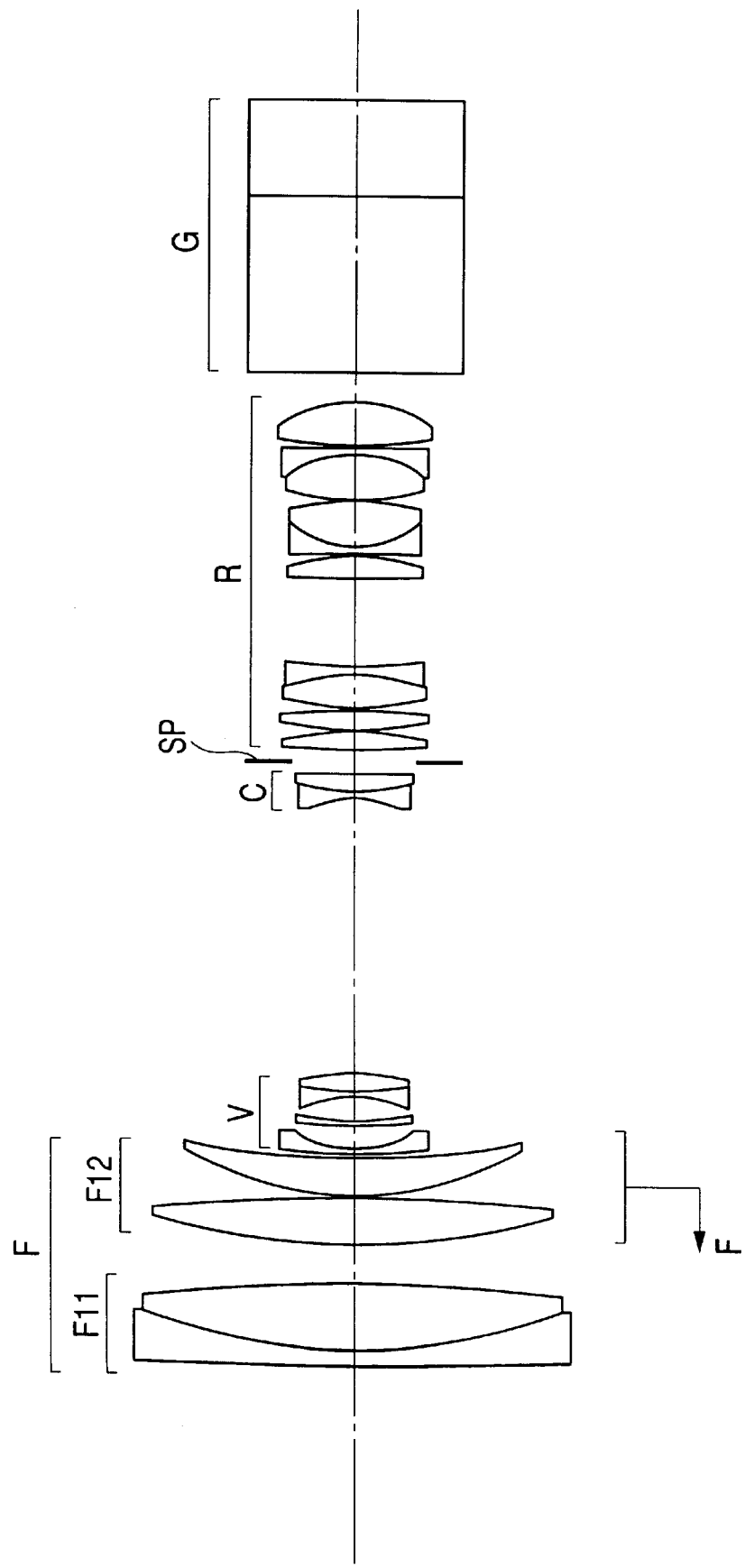
FIG. 1 is a lens cross-sectional view of Numerical Value Embodiment 1 of the present invention at the wide angle end thereof.
Figure 2:
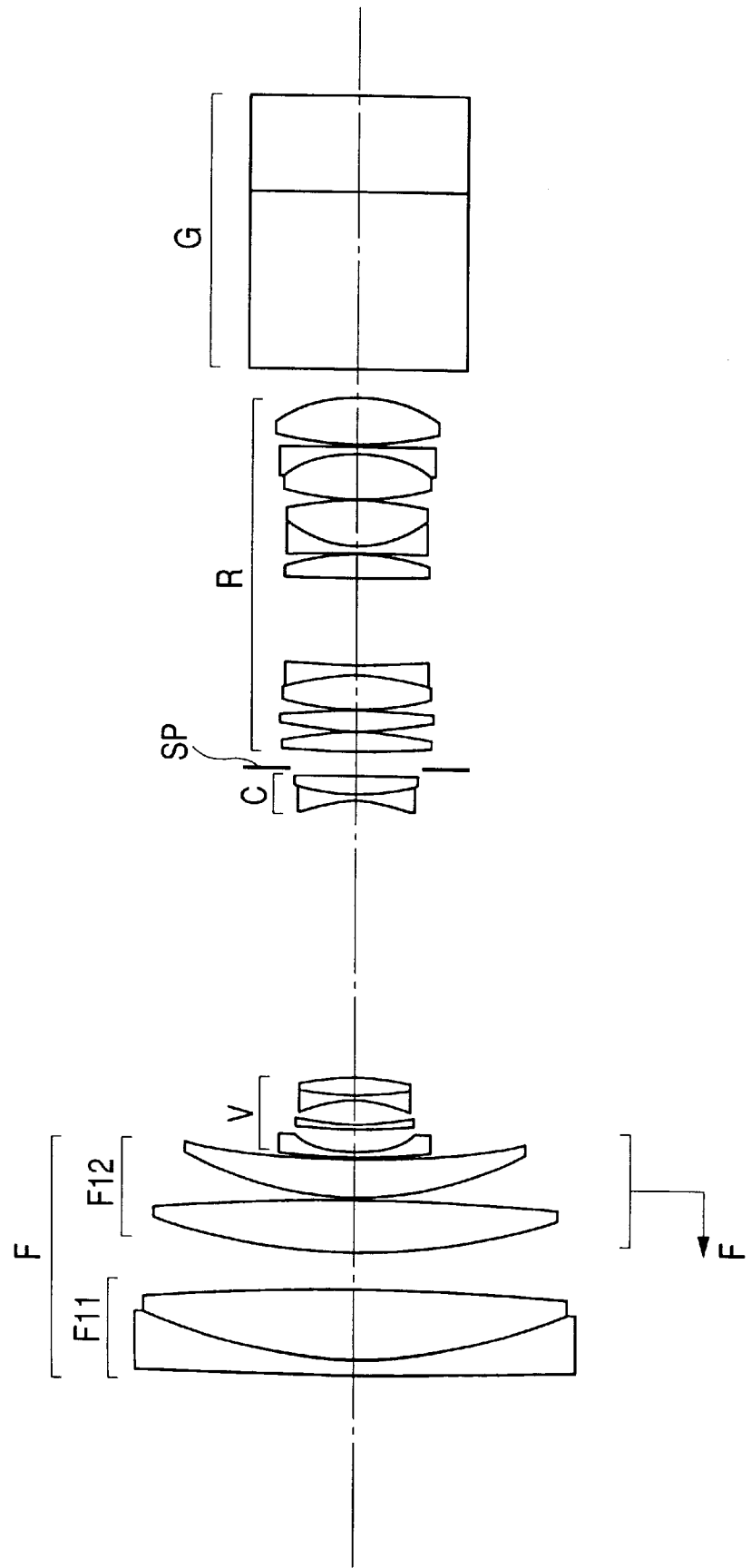
FIG. 2 is a lens cross-sectional view of Numerical Value Embodiment 2 of the present invention at the wide angle end thereof.
Figure 3:
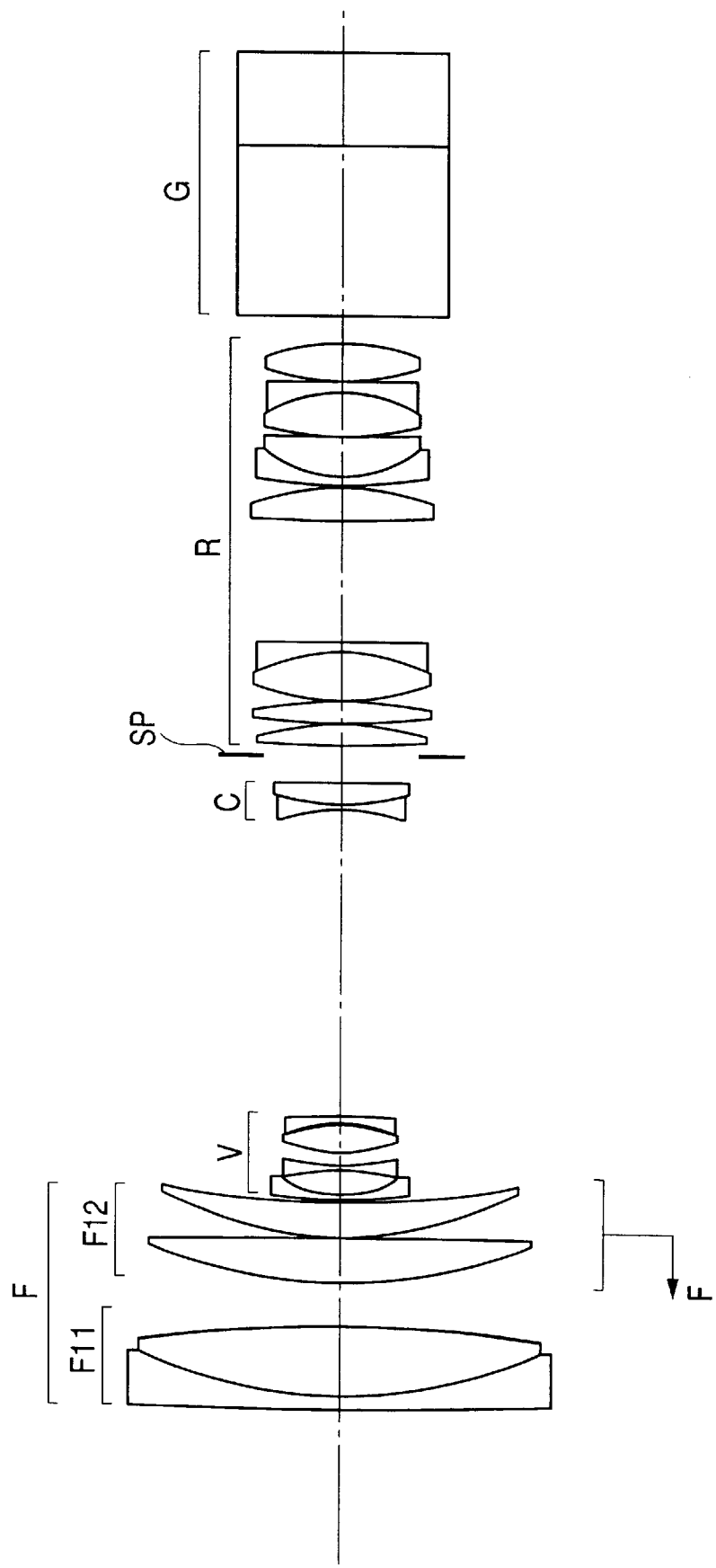
FIG. 3 is a lens cross-sectional view of Numerical Value Embodiment 3 of the present invention at the wide angle end thereof.
Figure 4:
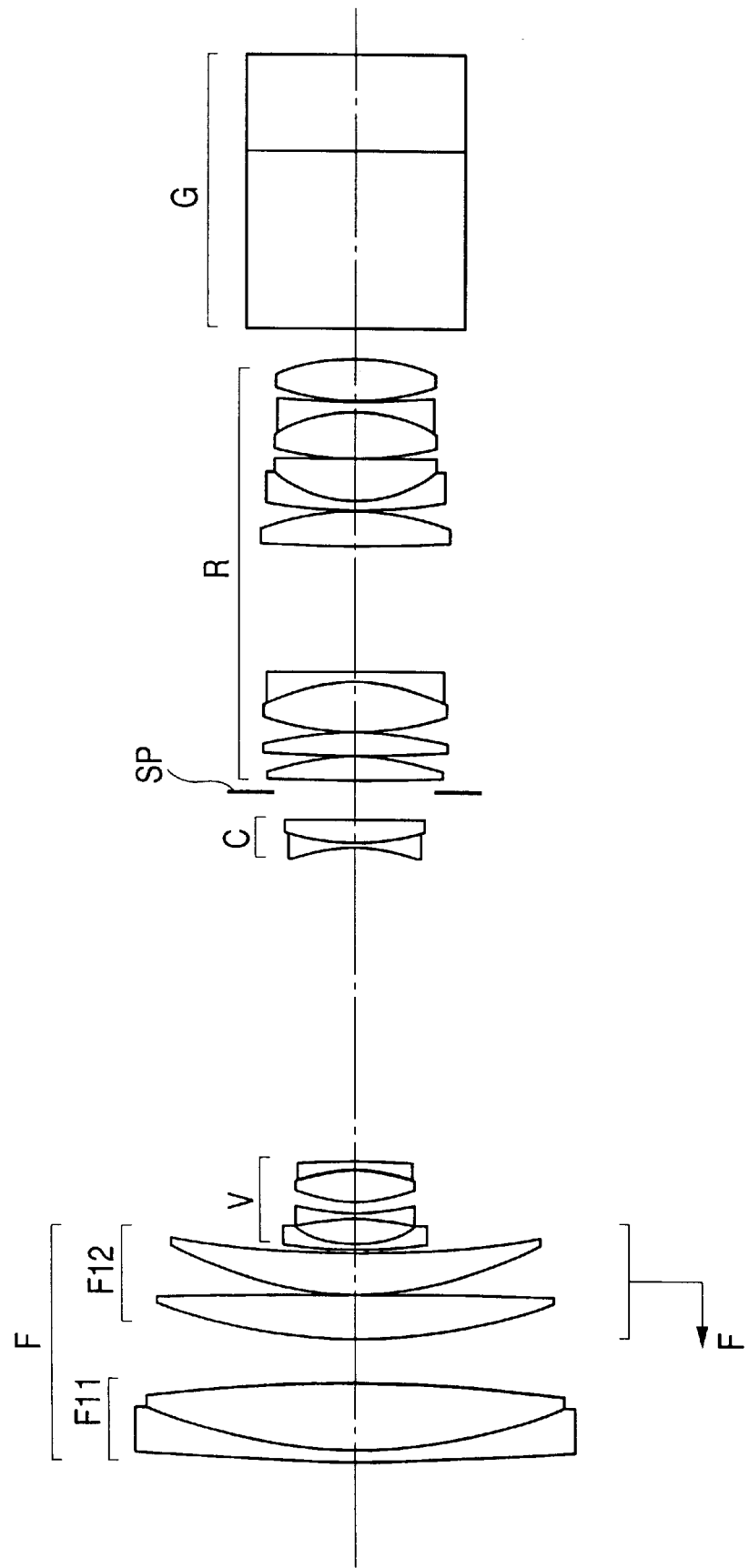
FIG. 4 is a lens cross-sectional view of Numerical Value Embodiment 4 of the present invention at the wide angle end thereof.
Figures 6A, 6B, 6C, 6D:
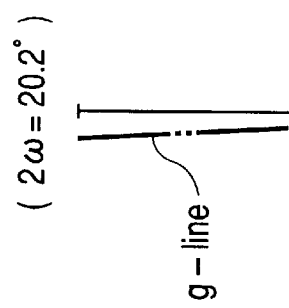
FIGS. 6A, 6B, 6C and 6D show the aberrations of Numerical Value Embodiment 1 of the present invention at the medium focal length thereof.

FIGS. 1, 2, 3 and 4 are lens cross-sectional views of Numerical Value Embodiments 1, 2, 3 and 4, respectively, of the present invention at the wide angle end thereof. FIGS. 5A to 5D through FIGS. 8A to 8D show the aberrations of Numerical Value Embodiment 1 of the present invention, FIGS. 9A to 9D through FIGS. 12A to 12D show the aberrations of Numerical Value Embodiment 2 of the present invention, FIGS. 13A to 13D through FIGS. 16A to 16D show the aberrations of Numerical Value Embodiment 3 of the present invention, and FIGS. 17A to 17D through FIGS.

20A to 20D show the aberrations of Numerical Value Embodiment 4 of the present invention.

In FIGS. 1, 2, 3 and 4, the letter F designates a first lens unit (front lens) of positive refractive power comprising two lens units, i.e., a front lens subunit F11 fixed and a rear lens subunit F12 movable, during focusing. The front lens subunit F11 comprises a first negative lens L111 and a second positive lens L112, and the rear lens subunit F12 has two first and second positive lenses L121 and L122. Focusing on an infinity object to a shortest distance object is effected with the rear lens subunit F12 moved toward the object side.

The letter V denotes a variator (second lens unit) of negative refractive power for focal length change which is adapted to be monotonously moved on the optical axis thereof toward the image plane side to thereby effect focal length change from the wide angle end to the telephoto end. The second lens unit V has its imaging magnification varied in an area including one-to-one magnification (−1 time) during focal length change.

The letter C designates a compensator (third lens unit) of negative refractive power which is movable to correct the fluctuation of the image plane resulting from focal length change. The letters SP denote a stop, and the letter R designates a relay lens unit (fourth lens unit) of positive refractive power. The letter G denotes a color resolving prism, an optical filter or the like which is shown as a glass block in FIGS. 1 to 4.

Generally, if in a four-unit zoom lens, an attempt is made to lengthen the focal length thereof at the telephoto end to thereby achieve a greater aperture ratio, the effective diameter of the front lens unit (first lens unit) is remarkably increased. This is because the incidence height of the on-axis ray of light increases, and this becomes a cause for increasing the amount of created aberrations including spherical aberration and chromatic aberration by zooming or focusing. Generally it is difficult to correct well the aberrations at this time.

In contrast, if the number of lenses is increased and the degree of freedom of design is increased, the entire lens system will become bulky and the weight and manufacturing cost thereof will increase.

Further, the front lens focusing system in which the entire first lens unit most adjacent to the object side is axially moved to thereby effect focusing has the characteristic that at each focal length, the amount of axial movement of the first lens unit becomes constant for the same object distance and therefore the lens barrel becomes simple. However, in a zoom lens in which a first lens unit has positive refractive power and which has a wide angle of view, when focusing is to be effected on a shortest distance object at the wide angle end, the first lens unit is moved toward the object side and therefore, if an attempt is made to secure a sufficient quantity of marginal light, the effective diameter of the first lens unit will be increased and also, driving torque for moving the relatively heavy first lens unit will become great and quick focusing will become difficult.

So, the present invention adopts the internal focus system in which, as previously described, focusing on an infinity object to a short distance object is effected with the rear lens subunit F12 in the first lens unit F moved toward the object side, thereby preventing any increase in the effective diameter of the first lens unit F, and achieving the downsizing of the entire lens system and further achieving the shortening of the shortest photographing distance.

Further, the front lens subunit F11 fixed during focusing is comprised, in succession from the object side, of a first negative lens L111 and a second positive lens L112, and is disposed as a cemented lens comprising these two lenses cemented together, and the refractive power of the cemented lens is set so as to satisfy conditional expression (1). Also, the shapes of the first negative lens L111 and the second positive lens L112 constituting the cemented lens and the shape of the cemented lens are set so as to satisfy conditional expressions (3), (4) and (5), respectively. These conditional expressions show that the focal length f11 of the front lens subunit F11 fixed during focusing becomes a considerably small negative refractive power, and also show that the shape of the cemented lens is the shape of a biconvex lens having a relatively gentle curvature approximate to that of a plane parallel plate and the cemented lens surface thereof has a deep curvature.

In addition, the difference in refractive power and the difference in dispersion between the materials of the first negative lens L111 and the second positive lens L112 constituting the cemented lens are set so as to satisfy conditional expressions (6) and (7). By adopting such a construction satisfying the respective conditions, the aberrations are corrected well and yet the maximum thickness of the lens is made small and also, downsizing is effectively achieved in such a manner as to push out the principal point of the front lens to the image side.

If conditional expressions (1), (3), (4) and (5) are departed from and the front lens subunit F11 is not made into a cemented lens, but is comprised of two independent lenses having an air space therebetween, not only plus and minus sudden aberrations will be created by an air lens formed between the two lenses and there arises the necessity of controlling high-order aberrations, but also the error of the air space by the manufacturing error of each element and the occurrence of mutual parallelism and eccentricity or inclination will lead to the deterioration of optical performance, and there will arise the demerit that stable optical performance is not obtained.

If a material such as super-low dispersion glass or fluorite having an Abbe number exceeding 90 is used as the material of the second positive lens L112 of the front lens subunit, a predetermined aberration correcting effect will be obtained even if refractive powers departing from conditional expressions (2), (3) and (4) are set. At this time, conditional expressions (2), (3) and (4) become unnecessary.

The rear lens subunit F12 movable during focusing is comprised of two positive lenses L121 and L122. Design is made such that the fluctuations of aberrations during focusing becomes small in such a manner that the refractive power f12 of the rear lens subunit F12 satisfies conditional expression (2).

If the focal length f12 of the rear lens subunit F12 movable during focusing becomes long beyond the upper limit value of conditional expression (2), the amount of axial movement for focusing on a shortest distance object will increase. Therefore, the dead space in the front lens unit F will increase and the entire front lens will become bulky. If conversely, the focal length f12 becomes too small beyond the lower limit value of conditional expression (2), the downsizing of the entire front lens unit F can be achieved, but the refractive power of each element of the rear lens subunit F12 movable during focusing will become too strong and it will become difficult to correct the fluctuations of aberrations due to zooming or focusing.

So, in the present embodiment, with the balance between optical performance and downsizing taken into account, design is made such that the focal length f12 of the rear lens subunit F12 satisfies conditional expression (2).

Further in the present invention, to correct well the fluctuations of aberrations during focusing, it is preferable to satisfy the following conditions:

$$0.5<(R5+R4)/(R5-R4)<1.2 \quad (8)$$

$$2.2<(R7+R6)/(R7-R6)<2.8 \quad (9)$$

$$1.6<(N121+N122)/2<1.7 \quad (10)$$

$$55<(v121+v122)/2<65 \quad (11)$$

$$0.4<D/f1<0.6 \quad (12)$$

where N121 and v121 are the refractive power and the Abbe number, respectively, of the material of the first positive lens 121 of the rear lens subunit F12, N122 and v122 are the refractive power and the Abbe number, respectively, of the material of the second positive lens L122 of the rear lens subunit F12, and D is the full length of the lens when the object distance of the first lens unit is infinity.

The respective constituent elements of the rear lens subunit F12 are set as shown by conditional expressions (8), (9), (10) and (11), whereby at the necessary minimum degree of freedom of design, various aberrations such as spherical aberration, astigmatism and distortion are corrected well. If the number of the constituents of the rear lens subunit F12 is increased, the degree of freedom of design will correspondingly decrease and the correction of aberrations will become easy.

Also, by satisfying conditional expression (12) so that the sufficient movement interval of the rear lens subunit F12 movable during focusing may be secured and that any unnecessary air space may not be created between the rear lens subunit F12 and the front lens subunit F11 fixed during focusing, the total thickness of the front lens (from the first lens surface to the last lens surface of the first lens unit) is made small.

Thus, in the present embodiment, the front lens unit F is comprised of the front lens subunit F11 fixed during focusing and the rear lens subunit F12 movable during focusing and the refractive power thereof, etc. are set appropriately, whereby the aberrations, particularly spherical aberration and on-axis chromatic aberration, within the entire zoom area and the entire focus range area are corrected well.

Further, in the present invention, to reduce the fluctuations of aberrations during focusing and obtain good optical performance over the entire object distance, it is preferable that the first negative lens L111 of the front lens subunit comprises a meniscus shape having its convex surface facing the object side, the second positive lens L112 of the front lens subunit has its both lens surfaces comprised of convex surfaces, the first positive lens L121 of the rear lens subunit has its both lens surfaces comprised of convex surfaces or comprises a meniscus shape having its convex surface facing the object side, and the second positive lens L122 of the rear lens subunit comprises a meniscus shape having its convex surface facing the object side.

It is also preferable that the second lens unit v comprises two negative lenses and a positive lens independently of one another or cemented together into a cemented lens, and the third lens unit C be comprised of a cemented lens comprising a negative lens and a positive lens cemented together.

Figures 11A, 11B, 11C, 11D:
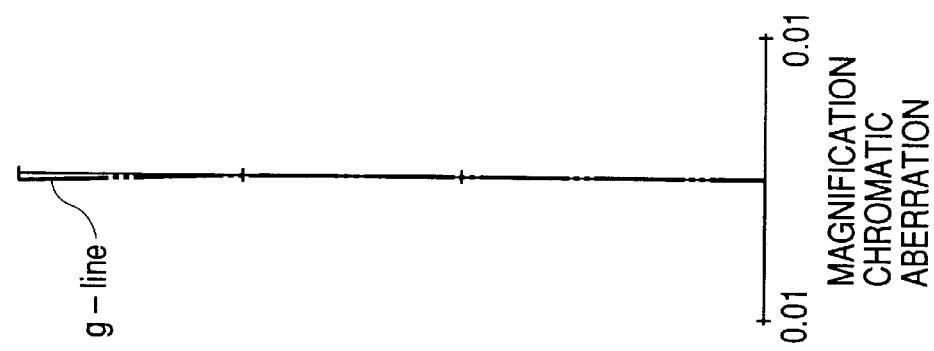
FIGS. 11A, 11B, 11C and 11D show the aberrations of Numerical Value Embodiment 2 of the present invention at the telephoto end thereof (the object distance is 300 mm).
Figure 14A:
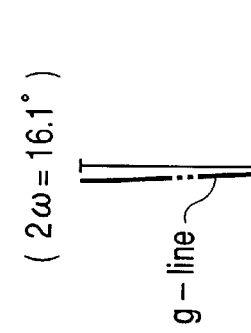
FIGS. 14A, 14B, 14C and 14D show the aberrations of Numerical Value Embodiment 3 of the present invention at the medium focal length thereof.
Figure 14B:
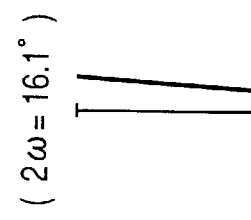
Figure 14C:
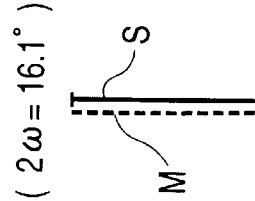
Figure 14D:
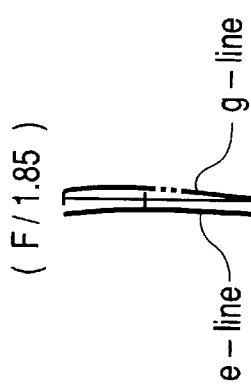

FIGS. 7A to 7D, FIGS. 11A to 11D, FIGS. 15A to 15D and FIGS. 19A to 19D show aberrations in a state in which the object distance at the telephoto end is 300 mm, and FIGS. 8A to 8D, FIGS. 12A to 12D, FIGS. 16A to 16D and FIGS. 20A to 20D show aberrations in a state in which the object distance is infinity. It will be seen from these figures that the fluctuations of aberrations resulting from changes in the object distance are small for both of the e-line and g-line.

The numerical value embodiments of the present invention will be shown below. In the numerical value embodiments, ri represents the radius of curvature of the ith lens surface from the object side, di represents the ith lens thickness or air space from the object side, and ni and vi represent the refractive power and Abbe number, respectively, of the glass of the ith lens from the object side.

Numerical Value Embodiment 1
f = 1.00000    fno = 1:1.85 to 2.0    2ω = 60.1° to 5.26°

| | | | | | | | |
|---|---|---|---|---|---|---|---|
| r1 = | 96.249 | d1 = | 0.23 | n1 = | 1.81265 | v1 = | 25.4 |
| r2 = | 9.936 | d2 = | 1.19 | n2 = | 1.48915 | v2 = | 70.2 |
| r3 = | −29.034 | d3 = | 0.67 | | | | |
| r4 = | 12.061 | d4 = | 0.86 | n3 = | 1.62287 | v3 = | 60.3 |
| r5 = | −40.202 | d5 = | 0.02 | | | | |
| r6 = | 5.584 | d6 = | 0.68 | n4 = | 1.65425 | v4 = | 58.5 |
| r7 = | 13.052 | d7 = | variable | | | | |
| r8 = | 8.376 | d8 = | 0.11 | n5 = | 1.88814 | v5 = | 40.8 |
| r9 = | 1.975 | d9 = | 0.42 | | | | |
| r10 = | 17.743 | d10 = | 0.08 | n6 = | 1.80811 | v6 = | 46.6 |
| r11 = | 5.523 | d11 = | 0.46 | | | | |
| r12 = | −1.944 | d12 = | 0.08 | n7 = | 1.77621 | v7 = | 49.6 |
| r13 = | 4.995 | d13 = | 0.33 | n8 = | 1.93306 | v8 = | 21.3 |
| r14 = | −5.197 | d14 = | variable | | | | |
| r15 = | −2.759 | d15 = | 0.09 | n9 = | 1.77621 | v9 = | 49.6 |
| r16 = | 3.082 | d16 = | 0.36 | n10 = | 1.81265 | v10 = | 25.4 |
| r17 = | −82.751 | d17 = | variable | | | | |
| r18 = | stop | d18 = | 0.19 | | | | |
| r19 = | 23.259 | d19 = | 0.37 | n11 = | 1.72793 | v11 = | 38.0 |
| r20 = | −4.709 | d20 = | 0.02 | | | | |
| r21 = | 6.634 | d21 = | 0.37 | n12 = | 1.62032 | v12 = | 63.4 |
| r22 = | −10.879 | d22 = | 0.02 | | | | |
| r23 = | 4.794 | d23 = | 0.61 | n13 = | 1.48915 | v13 = | 70.2 |
| r24 = | −3.509 | d24 = | 0.17 | n14 = | 1.83932 | v14 = | 37.2 |
| r25 = | 15.564 | d25 = | 1.58 | | | | |
| r26 = | −105.908 | d26 = | 0.35 | n15 = | 1.50349 | v15 = | 56.4 |
| r27 = | −4.869 | d27 = | 0.02 | | | | |
| r28 = | 71.845 | d28 = | 0.15 | n16 = | 1.83832 | v16 = | 37.2 |
| r29 = | 1.780 | d29 = | 0.78 | n17 = | 1.50349 | v17 = | 56.4 |
| r30 = | −7.213 | d30 = | 0.02 | | | | |
| r31 = | 5.514 | d31 = | 0.82 | n18 = | 1.51825 | v18 = | 64.2 |
| r32 = | −1.967 | d32 = | 0.15 | n19 = | 1.80811 | v19 = | 46.6 |
| r33 = | −29.013 | d33 = | 0.03 | | | | |
| r34 = | 9.060 | d34 = | 0.74 | n20 = | 1.50349 | v20 = | 56.4 |
| r35 = | −2.442 | d35 = | 0.53 | | | | |
| r36 = | ∞ | d36 = | 3.16 | n21 = | 1.60718 | v21 = | 38.0 |
| r37 = | ∞ | d37 = | 1.71 | n22 = | 1.51825 | v22 = | 64.2 |
| r38 = | ∞ | | | | | | |

| focal length variable interval | 1.00 | 3.25 | 12.60 |
|---|---|---|---|
| d7 | 0.07 | 3.10 | 4.81 |
| d14 | 4.85 | 1.39 | 0.16 |
| d17 | 0.21 | 0.64 | 0.15 |

Numerical Value Embodiment 2
f = 1.00000    fno = 1:1.85 to 2.0    2ω = 60.1° to 5.26°

| | | | | | | | |
|---|---|---|---|---|---|---|---|
| r1 = | 56.973 | d1 = | 0.23 | n1 = | 1.76168 | v1 = | 27.5 |
| r2 = | 8.329 | d2 = | 1.20 | n2 = | 1.49845 | v2 = | 81.5 |
| r3 = | −73.454 | d3 = | 0.68 | | | | |
| r4 = | 10.984 | d4 = | 0.96 | n3 = | 1.62032 | v3 = | 63.4 |
| r5 = | −35.892 | d5 = | 0.02 | | | | |
| r6 = | 5.815 | d6 = | 0.65 | n4 = | 1.69979 | v4 = | 55.5 |
| r7 = | 12.668 | d7 = | variable | | | | |
| r8 = | 10.568 | d8 = | 0.11 | n5 = | 1.88814 | v5 = | 40.8 |
| r9 = | 2.047 | d9 = | 0.39 | | | | |
| r10 = | 12.973 | d10 = | 0.08 | n6 = | 1.80811 | v6 = | 46.6 |
| r11 = | 4.987 | d11 = | 0.46 | | | | |
| r12 = | −1.980 | d12 = | 0.08 | n7 = | 1.77621 | v7 = | 49.6 |

-continued

Numerical Value Embodiment 2
f = 1.00000    fno = 1:1.85 to 2.0    2ω = 60.1° to 5.26°

| | | | | | | |
|---|---|---|---|---|---|---|
| r13 = | 4.859 | d13 = | 0.34 | n8 = | 1.93306 v8 = | 21.3 |
| r14 = | −5.305 | d14 = | variable | | | |
| r15 = | −2.759 | d15 = | 0.09 | n9 = | 1.77621 v9 = | 49.6 |
| r16 = | 3.082 | d16 = | 0.36 | n10 = | 1.81265 v10 = | 25.4 |
| r17 = | −82.751 | d17 = | variable | | | |
| r18 = | stop | d18 = | 0.24 | | | |
| r19 = | 23.259 | d19 = | 0.36 | n11 = | 1.72793 v11 = | 38.0 |
| r20 = | −4.749 | d20 = | 0.02 | | | |
| r21 = | 6.470 | d21 = | 0.36 | n12 = | 1.62032 v12 = | 63.4 |
| r22 = | −11.349 | d22 = | 0.02 | | | |
| r23 = | 4.663 | d23 = | 0.61 | n13 = | 1.48915 v13 = | 70.2 |
| r24 = | −3.565 | d24 = | 0.17 | n14 = | 1.83932 v14 = | 37.2 |
| r25 = | 12.185 | d25 = | 1.58 | | | |
| r26 = | −112.080 | d26 = | 0.36 | n15 = | 1.50349 v15 = | 56.4 |
| r27 = | −4.73 | d27 = | 0.02 | | | |
| r28 = | 21.834 | d28 = | 0.15 | n16 = | 1.83932 v16 = | 37.2 |
| r29 = | 1.785 | d29 = | 0.77 | n17 = | 1.50349 v17 = | 56.4 |
| r30 = | −8.612 | d30 = | 0.02 | | | |
| r31 = | 5.602 | d31 = | 0.84 | n18 = | 1.51825 v18 = | 64.2 |
| r32 = | −2.021 | d32 = | 0.15 | n19 = | 1.80811 v19 = | 46.6 |
| r33 = | −107.805 | d33 = | 0.03 | | | |
| r34 = | 7.611 | d34 = | 0.79 | n20 = | 1.50349 v20 = | 56.4 |
| r35 = | −2.495 | d35 = | 0.53 | | | |
| r36 = | ∞ | d36 = | 3.16 | n21 = | 1.60718 v21 = | 38.0 |
| r37 = | ∞ | d37 = | 1.71 | n22 = | 1.51825 v22 = | 64.2 |
| r38 = | ∞ | | | | | |

| focal length variable interval | 1.00 | 3.25 | 12.60 |
|---|---|---|---|
| d7 | 0.07 | 3.10 | 4.81 |
| d14 | 4.85 | 1.39 | 0.16 |
| d17 | 0.21 | 0.64 | 0.15 |

Numerical Value Embodiment 3
f = 1 to 19.5    fno = 1:1.85 to 2.85    2ω = 60.1° to 3.4°

| | | | | | | |
|---|---|---|---|---|---|---|
| r1 = | 63.185 | d1 = | 0.23 | n1 = | 1.76168 v1 = | 27.5 |
| r2 = | 8.575 | d2 = | 1.20 | n2 = | 1.49845 v2 = | 81.6 |
| r3 = | −30.627 | d3 = | 0.80 | | | |
| r4 = | 9.126 | d4 = | 0.83 | n3 = | 1.62287 v3 = | 60.3 |
| r5 = | 320.496 | d5 = | 0.02 | | | |
| r6 = | 6.949 | d6 = | 0.63 | n4 = | 1.73234 v4 = | 54.7 |
| r7 = | 15.338 | d7 = | variable | | | |
| r8 = | 11.731 | d8 = | 0.08 | n5 = | 1.88814 v5 = | 40.8 |
| r9 = | 1.770 | d9 = | 0.49 | | | |
| r10 = | −5.036 | d10 = | 0.07 | n6 = | 1.82017 v6 = | 46.6 |
| r11 = | 3.556 | d11 = | 0.24 | | | |
| r12 = | 3.047 | d12 = | 0.55 | n7 = | 1.81264 v7 = | 25.4 |
| r13 = | −3.073 | d13 = | 0.06 | | | |
| r14 = | −2.596 | d14 = | 0.07 | n8 = | 1.79196 v8 = | 47.4 |
| r15 = | 13.955 | d15 = | variable | | | |
| r16 = | −3.032 | d16 = | 0.16 | n9 = | 1.74679 v9 = | 49.3 |
| r17 = | 3.918 | d17 = | 0.40 | n10 = | 1.85501 v10 = | 23.9 |
| r18 = | 47.266 | d18 = | variable | | | |
| r19 = | stop | d19 = | 0.19 | | | |
| r20 = | ∞ | d20 = | 0.40 | n11 = | 1.72793 v11 = | 38.0 |
| r21 = | −4.904 | d21 = | 0.02 | | | |
| r22 = | 17.548 | d22 = | 0.41 | n12 = | 1.51314 v12 = | 60.5 |
| r23 = | −6.691 | d23 = | 0.02 | | | |
| r24 = | 4.438 | d24 = | 0.88 | n13 = | 1.48915 v13 = | 70.2 |
| r25 = | −3.570 | d25 = | 0.17 | n14 = | 1.83932 v14 = | 37.2 |
| r26 = | 18.124 | d26 = | 2.24 | | | |
| r27 = | 11.730 | d27 = | 0.65 | n15 = | 1.50349 v15 = | 56.4 |
| r28 = | −4.718 | d28 = | 0.02 | | | |
| r29 = | 8.701 | d29 = | 0.15 | n16 = | 1.83932 v16 = | 37.2 |
| r30 = | 2.173 | d30 = | 0.75 | n17 = | 1.50349 v17 = | 56.4 |
| r31 = | 29.991 | d31 = | 0.02 | | | |
| r32 = | 6.383 | d32 = | 0.79 | n18 = | 1.51825 v18 = | 64.2 |
| r33 = | −2.590 | d33 = | 0.15 | n19 = | 1.80811 v19 = | 46.6 |
| r34 = | 11.137 | d34 = | 0.03 | | | |
| r35 = | 4.650 | d35 = | 0.70 | n20 = | 1.50349 v20 = | 56.4 |
| r36 = | −3.908 | d36 = | 0.53 | | | |
| r37 = | ∞ | d37 = | 3.16 | n21 = | 1.60718 v21 = | 38.0 |

-continued

Numerical Value Embodiment 3
f = 1 to 19.5    fno = 1:1.85 to 2.85    2ω = 60.1° to 3.4°

| | | | | | | |
|---|---|---|---|---|---|---|
| r38 = | ∞ | d38 = | 1.71 | n22 = | 1.51825 v22 = | 64.2 |
| r39 = | ∞ | | | | | |

| focal length variable interval | 1.00 | 4.09 | 19.50 |
|---|---|---|---|
| d7 | 0.07 | 3.79 | 5.48 |
| d15 | 5.66 | 1.41 | 0.67 |
| d18 | 0.54 | 1.07 | 0.12 |

Numerical Value Embodiment 4
f = 1 to 19.25    fno = 1:1.85 to 2.85    2ω = 60.1° to 3.4°

| | | | | | | |
|---|---|---|---|---|---|---|
| r1 = | 34.987 | d1 = | 0.23 | n1 = | 1.81265 v1 = | 25.4 |
| r2 = | 9.229 | d2 = | 1.11 | n2 = | 1.48915 v2 = | 70.2 |
| r3 = | −43.027 | d3 = | 0.81 | | | |
| r4 = | 10.232 | d4 = | 0.77 | n3 = | 1.59446 v3 = | 68.3 |
| r5 = | −239.600 | d5 = | 0.02 | | | |
| r6 = | 6.394 | d6 = | 0.69 | n4 = | 1.65425 v4 = | 58.5 |
| r7 = | 16.227 | d7 = | variable | | | |
| r8 = | 13.666 | d8 = | 0.08 | n5 = | 1.88814 v5 = | 40.8 |
| r9 = | 1.790 | d9 = | 0.50 | | | |
| r10 = | −4.884 | d10 = | 0.07 | n6 = | 1.82017 v6 = | 46.6 |
| r11 = | 3.329 | d11 = | 0.21 | | | |
| r12 = | 3.029 | d12 = | 0.55 | n7 = | 1.81264 v7 = | 25.4 |
| r13 = | −3.061 | d13 = | 0.04 | | | |
| r14 = | −2.652 | d14 = | 0.07 | n8 = | 1.79196 v8 = | 47.4 |
| r15 = | 18.278 | d15 = | variable | | | |
| r16 = | −3.054 | d16 = | 0.08 | n9 = | 1.74679 v9 = | 49.3 |
| r17 = | 3.855 | d17 = | 0.37 | n10 = | 1.85501 v10 = | 23.9 |
| r18 = | 42.160 | d18 = | variable | | | |
| r19 = | stop | d19 = | 0.19 | | | |
| r20 = | ∞ | d20 = | 0.38 | n11 = | 1.72793 v11 = | 38.0 |
| r21 = | −4.964 | d21 = | 0.02 | | | |
| r22 = | 17.349 | d22 = | 0.40 | n12 = | 1.51314 v12 = | 60.5 |
| r23 = | −6.835 | d23 = | 0.02 | | | |
| r24 = | 4.386 | d24 = | 0.86 | n13 = | 1.48915 v13 = | 70.2 |
| r25 = | −3.578 | d25 = | 0.17 | n14 = | 1.83932 v14 = | 37.2 |
| r26 = | 18.414 | d26 = | 2.32 | | | |
| r27 = | 12.129 | d27 = | 0.65 | n15 = | 1.50349 v15 = | 56.4 |
| r28 = | −4.710 | d28 = | 0.02 | | | |
| r29 = | 8.494 | d29 = | 0.15 | n16 = | 1.83932 v16 = | 37.2 |
| r30 = | 2.185 | d30 = | 0.75 | n17 = | 1.50349 v17 = | 56.4 |
| r31 = | 33.862 | d31 = | 0.02 | | | |
| r32 = | 6.432 | d32 = | 0.80 | n18 = | 1.51825 v18 = | 64.2 |
| r33 = | −2.576 | d33 = | 0.15 | n19 = | 1.80811 v19 = | 46.6 |
| r34 = | 11.174 | d34 = | 0.03 | | | |
| r35 = | 4.646 | d35 = | 0.71 | n20 = | 1.50349 v20 = | 56.4 |
| r36 = | −3.913 | d36 = | 0.53 | | | |
| r37 = | ∞ | d37 = | 3.16 | n21 = | 1.60718 v21 = | 38.0 |
| r38 = | ∞ | d38 = | 1.71 | n22 = | 1.51825 v22 = | 64.2 |
| r39 = | ∞ | | | | | |

| focal length variable interval | 1.00 | 4.09 | 19.50 |
|---|---|---|---|
| d7 | 0.07 | 3.79 | 5.48 |
| d15 | 5.66 | 1.41 | 0.66 |
| d18 | 0.54 | 1.07 | 0.12 |

TABLE 1

| | | Numerical Value Embodiments | | | |
|---|---|---|---|---|---|
| Conditional Expressions | | 1 | 2 | 3 | 4 |
| (1) | f11/f1 | −19.5 | −11.7 | −59.3 | −43.14 |
| (2) | f12/f1 | 0.97 | 0.94 | 1.0 | 1.0 |
| (3) | (R2 + R1)/(R2 − R1) | −1.23 | −1.34 | −1.31 | −1.72 |
| (4) | (R3 + R2)/(R3 − R2) | 0.49 | 0.80 | 0.56 | 0.65 |
| (5) | (R3 + R1)/(R3 − R1) | −0.54 | 0.13 | −0.35 | 0.10 |

TABLE 1-continued

| | | Numerical Value Embodiments | | | |
|---|---|---|---|---|---|
| Conditional Expressions | | 1 | 2 | 3 | 4 |
| (6) | N111 − N112 | 0.32 | 0.26 | 0.26 | 0.32 |
| (7) | ν111 − ν112 | 44.80 | 54.00 | 54.10 | 44.80 |
| (8) | (R5 + R4)/(R5 − R4) | 0.54 | 0.53 | 1.06 | 0.92 |
| (9) | (R7 + R6)/(R7 − R6) | 2.50 | 2.70 | 2.66 | 2.30 |
| (10) | (N121 + N122)/2 | 1.64 | 1.66 | 1.67 | 1.62 |
| (11) | (ν121 + ν122)/2 | 59.40 | 59.50 | 57.48 | 63.43 |
| (12) | D/f1 | 0.48 | 0.49 | 0.46 | 0.45 |

According to the present invention, as described above, there can be provided a four-unit zoom lens of a great aperture ratio and a high variable power ratio having F number of the order of 1.8 at the wide angle end and a variable power ratio of the order of 13 to 20 times in which the refractive power or the like of a front lens unit (first lens unit) is set appropriately and the front lens unit is divided into a front lens subunit fixed and a rear lens subunit movable, during focusing, and the disposition of each lens element, the apportionment of aberration correction and the apportionment of achromatism are prescribed so as to satisfy predetermined conditions to thereby reduce the fluctuations of spherical aberration and chromatic aberration resulting from focal length change and focusing, and further well-balancedly correct the fluctuations of on-axis aberrations such as astigmatism and curvature of image field resulting from focal length change, and which has high optical performance over the entire variable power range and the entire focus range.

What is claimed is:

1. A zoom lens comprising:

in succession from the object side, a first lens unit of positive refractive power;

a second lens unit of negative refractive power;

a third lens unit; and a fourth lens unit of positive refractive power, said second and third lens units being moved to effect zooming, said first lens unit comprising, in order from the object side, a front lens subunit fixed during focusing and a rear lens subunit movable toward the object side for focusing from an infinite object to a short distance object, said front lens subunit comprising a cemented lens comprising a first negative lens and a second positive lens cemented together, said rear lens subunit comprising a first positive lens and a second positive lens, said zoom lens satisfying the following conditions:

$f_{11}/f_1 < -10$ $0.85 < f_{12}/f_1 < 1.1$ $-1.77 < (R_2+R_1)/(R_2-R_1) < -1.15$ $0.45 < (R_3+R_2)/(R_3-R_2) < 0.9$ $-0.7 < (R_3+R_1)/(R_3-R_1) < 0.2$ where f1, f11, and f12 are the focal lengths of said first lens unit, said front lens subunit, and said rear lens subunit, respectively, and Ri is the radius of curvature of the ith lens surface as counted from the object side of said first lens unit.

2. A zoom lens according to claim 1, further satisfying the following conditions:

$0.25 < N_{111} - N_{112}$ $40 < |\nu_{111} - \nu_{112}|$, where N111 and ν111 are the refractive power and the Abbe number, respectively, of the material of the first negative lens of said front lens subunit, and N112 and ν112 are the refractive power and the Abbe number, respectively, of the material of the second positive lens of said front lens subunit.

3. A zoom lens according to claim 1, further satisfying the following conditions:

$0.5 < (R_5+R_4)/(R_5-R_4) < 1.2$ $2.2 < (R_7+R_6)/(R_7-R_6) < 2.8$ $1.6 < (N_{121}+N_{122})/2 < 1.7$ $55 < (\nu_{121}+\nu_{122})/2 < 65$ $0.4 < D/f_1 < 0.6$, wherein N121 and ν121 are the refractive power and the Abbe number, respectively, of the material of the first positive lens of said rear lens subunit, N122 and ν122 are the refractive power and the Abbe number, respectively, of the material of the second positive lens of said rear lens subunit, and D is the full lens length when the object distance of said first lens unit is infinity.

4. A zoom lens according to claim 3, wherein the first negative lens of said front lens subunit is of a meniscus shape having its convex surface facing the object side, the second positive lens of said front lens subunit has its both lens surfaces comprising convex surfaces, the first positive lens of said rear lens subunit has its both surfaces comprising convex surfaces or is of a meniscus shape having its convex surface facing the object side, and the second positive lens of said rear lens subunit is of a meniscus shape having its convex surface facing the object side.

5. A zoom lens according to claim 1, wherein said third lens unit has a negative refractive power.

* * * * *

UNITED STATES PATENT AND TRADEMARK OFFICE
CERTIFICATE OF CORRECTION

PATENT NO. : 6,002,528
DATED : December 14, 1999
INVENTOR(S) : Yasuyuki TOMITA

It is certified that error appears in the above-identified patent and that said Letters Patent is hereby corrected as shown below:

COLUMN 2:

Line 39, "means" should read --the means--.

COLUMN 3:

Line 7, "a" should read --an--.
Line 34, "f/11" should read --f11--.
Line 46, "." should read --,--.

Signed and Sealed this

Tenth Day of April, 2001

Attest:

NICHOLAS P. GODICI

Attesting Officer      Acting Director of the United States Patent and Trademark Office